(12) United States Patent
Sutou et al.

(10) Patent No.: US 10,544,310 B2
(45) Date of Patent: Jan. 28, 2020

(54) HYDRAULIC TRANSFER FILM AND METHOD FOR MANUFACTURING DECORATED MOLDED ARTICLE USING SAME

(71) Applicants: Masatoshi Sutou, Fujimi (JP); Takeshi Iizuka, Saitama (JP); Takami Sendai, Fujimino (JP)

(72) Inventors: Masatoshi Sutou, Fujimi (JP); Takeshi Iizuka, Saitama (JP); Takami Sendai, Fujimino (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 71 days.

(21) Appl. No.: 14/430,726

(22) PCT Filed: Sep. 27, 2013

(86) PCT No.: PCT/JP2013/076415
§ 371 (c)(1),
(2) Date: Mar. 24, 2015

(87) PCT Pub. No.: WO2014/051112
PCT Pub. Date: Apr. 3, 2014

(65) Prior Publication Data
US 2015/0259540 A1 Sep. 17, 2015

(30) Foreign Application Priority Data
Sep. 28, 2012 (JP) ................................. 2012-218768

(51) Int. Cl.
*B44C 1/175* (2006.01)
*C09D 5/00* (2006.01)
(Continued)

(52) U.S. Cl.
CPC ................ *C09D 5/00* (2013.01); *B29C 39/14* (2013.01); *B44C 1/105* (2013.01); *B44C 1/1752* (2013.01);
(Continued)

(58) Field of Classification Search
CPC ..... B44C 1/1752; B44C 1/165–1/1758; C09D 133/066; C09D 133/08–133/12
See application file for complete search history.

(56) References Cited

U.S. PATENT DOCUMENTS 4,337,289 A * 6/1982 Reed ........................ B41M 3/12
156/234
4,719,132 A * 1/1988 Porter, Jr. .............. B05D 5/068
427/407.1
(Continued)

FOREIGN PATENT DOCUMENTS

EP 0359532 A2 * 3/1990 .......... B41M 7/0027
EP 1052116 A2 11/2000
(Continued)

OTHER PUBLICATIONS

Machine translation of Japanese Patent Publication No. JP 05-293925 A, originally published Nov. 1993, 9 pages.*
(Continued)

*Primary Examiner* — William P Bell
(74) *Attorney, Agent, or Firm* — Fitch, Even, Tabin & Flannery, LLP

(57) ABSTRACT

Provided are a hydraulic transfer film capable of manufacturing a decorated molded product that expresses a design with a concavo-convex feeling by a hydraulic transfer method and having excellent transfer processability and a method for manufacturing a decorated molded product using the same. The hydraulic transfer film includes a water-soluble film having thereon a design layer, wherein the
(Continued)

design layer has a low-gloss portion and a high-gloss portion; the low-gloss portion and the high-gloss portion are present at least within a plane on the water-soluble film side of the design layer; the low-gloss portion contains a binder resin and a deglossing agent; and the high-gloss portion is composed of a resin composition containing an acrylic polymer polyol and/or a cured product thereof.

17 Claims, 2 Drawing Sheets

(51) Int. Cl.
    *B29C 39/14*     (2006.01)
    *B44C 1/10*     (2006.01)
    *C09D 101/18*     (2006.01)
    *C09D 133/14*     (2006.01)
    *B29K 75/00*     (2006.01)
    *B29L 9/00*     (2006.01)

(52) U.S. Cl.
    CPC ......... *C09D 101/18* (2013.01); *C09D 133/14* (2013.01); *B29K 2075/00* (2013.01); *B29L 2009/005* (2013.01); *Y10T 428/24802* (2015.01)

(56) References Cited

U.S. PATENT DOCUMENTS

| | | | | | |
|---|---|---|---|---|---|
| 5,270,097 | A | * | 12/1993 | Amemiya | B41M 3/06 428/151 |
| 5,695,587 | A | * | 12/1997 | Dumoux | B44C 1/1756 156/230 |
| 5,916,502 | A | * | 6/1999 | Niwa | B44C 1/175 101/177 |
| 2002/0192378 | A1 | * | 12/2002 | Hori | B44C 1/105 427/256 |
| 2003/0108675 | A1 | * | 6/2003 | Kawaharada | B05D 1/20 427/256 |
| 2005/0175818 | A1 | * | 8/2005 | Kawabata | B32B 7/12 428/195.1 |
| 2005/0228069 | A1 | * | 10/2005 | Kataoka | C09C 3/10 523/160 |
| 2007/0154685 | A1 | * | 7/2007 | Ikeda | B44C 1/1752 428/195.1 |

FOREIGN PATENT DOCUMENTS

| | | | |
|---|---|---|---|
| JP | 60-165300 A | | 8/1985 |
| JP | 61-066685 A | | 4/1986 |
| JP | 05293925 A | * | 11/1993 |
| JP | 2007-203655 A | | 8/2007 |
| JP | 2007-253617 A | | 10/2007 |
| JP | 2007-253627 A | | 10/2007 |
| JP | 2010100050 A | * | 5/2010 |
| JP | 2013-230612 A | | 11/2013 |
| WO | 2011/010658 A1 | | 1/2011 |
| WO | 2011/102509 A1 | | 8/2011 |
| WO | 2012/099007 A1 | | 7/2012 |

OTHER PUBLICATIONS

PCI Magazine, "UV-Curable Acrylic Urethane Coatings for Weatherable Applications", published Feb. 1, 2004, available online at http://www.pcimag.com/articles/84936-uv-curable-acrylic-urethane-coatings-for-weatherable-applications, 18 pages.*
Machine translation of Japanese Patent Publication No. JP-2010100050A, originally published May 2010, 22 pages (Year: 2010).*
Full translation of Japanese Patent Publication No. JP-05293925A, originally published Nov. 9, 1993 (Year: 1993).*
Full translation of Japanese Patent Publication No. JP-2010100050A, originally published Sep. 28, 2009 (Year: 2009).*
International Search Report for International Application No. PCT/JP2013/076415 dated Dec. 17, 2013.
Office Action of CN Appln. No. 201380049748.4 dated Nov. 1, 2016.
Office Action of TW Appln. No. 10621326240 dated Dec. 29, 2017.

* cited by examiner

HYDRAULIC TRANSFER FILM AND METHOD FOR MANUFACTURING DECORATED MOLDED ARTICLE USING SAME

TECHNICAL FIELD

The present invention relates to a hydraulic transfer film which is suitable for forming a transfer layer on the surface of a molded product having a three-dimensional surface or curved surface and also to a method for manufacturing a decorated molded product using the same.

BACKGROUND ART

Molded products the surfaces of which are provided with decorations such as a wood-grain tone, a metallic tone (metallic luster), etc. are utilized for automotive interior products, household electrical appliances, OA instruments, or the like. A lot of these molded products have a complicated three-dimensional shape, and methods for simply applying a decoration with high design properties to such a molded product having a complicated shape have been conventionally investigated.

As for such a decoration method, there is known a hydraulic transfer method utilizing a hydraulic pressure. According to this hydraulic transfer method, a transfer film in which a desired decorative layer is printed on a water-soluble film having water-solubility or water-swelling property is prepared, and an activator composition composed of an organic solvent is coated on the decorative layer of the transfer film, thereby swelling the decorative layer and making it sticky (this is named "activation"). Before or after that, the above-described transfer film is floated on the water surface such that the surface of the decorative layer for transfer (printed layer) faces upward; subsequently, an article working as a transfer object is pressed on the transfer film; the transfer film is brought into intimate contact with the surface to be transferred of the transfer object, to which decoration processing is to be applied, by a hydraulic pressure; and thereafter, the water-soluble film is removed, so that the decorative layer is transferred (see, for example, PTLs 1 and 2).

While such a hydraulic transfer method is an excellent curved surface decoration method from the standpoints that "depth" such as a sense of clear coating, etc. or adaptability to the three-dimensional surface and pattern expression with high quality can be achieved, and the like, a method in which a three-dimensional feeling is further added thereto, thereby imparting a more excellent sense of high quality is demanded. Meanwhile, PTL 3 discloses a method for imparting a three-dimensional feeling by providing a hydraulic transfer sheet with protrusions made from a filling ink. However, according to this method, though a three-dimensional feeling is obtained, there was involved such a problem that surface smoothness or gloss is sacrificed, so that it is difficult to express a delicate appearance design, and the manufacture cannot be achieved by using an existent apparatus.

CITATION LIST

Patent Literature

PTL 1: JP-A-61-66685
PTL 2: JP-A-60-165300
PTL 3: JP-A-2007-203655

SUMMARY OF INVENTION

Technical Problem

Under such circumstances, a technical problem of the present invention is to provide a hydraulic transfer film capable of manufacturing a decorated molded product that expresses a design with a concavo-convex feeling by a hydraulic transfer method and a method for manufacturing a decorated molded product using the same.

Solution to Problem

In order to solve the above-described problem, the present inventors made extensive and intensive investigations. As a result, it has been found that the above-described problem may be solved by a hydraulic transfer film having a design layer having a low-gloss portion and a high-gloss portion on a water-soluble film, wherein a specified material is used for the high-gloss portion. The present invention has been accomplished on the basis of such findings.

The present invention provides

[1] A hydraulic transfer film comprising a water-soluble film having thereon a design layer, wherein the design layer has a low-gloss portion and a high-gloss portion; the low-gloss portion and the high-gloss portion are present at least within an end face on the water-soluble film side of the design layer; the low-gloss portion contains a binder resin and a deglossing agent; and the high-gloss portion is composed of a resin composition containing an acrylic polymer polyol and/or a cured product thereof, and

[2] A method for manufacturing a decorated molded product comprising using the hydraulic transfer film as set forth above in [1] and including the following steps (a) to (d):

Step (a): a step of floating the hydraulic transfer film on the water surface such that the water-soluble film side faces on the water surface;

Step (b): a step of coating an activator composition on the design layer side of the hydraulic transfer film;

Step (c): a step of pressing a transfer object onto the hydraulic transfer film having gone through the steps (a) and (b) and bringing the design layer into intimate contact with the surface to be transferred of the transfer object by a hydraulic pressure; and Step (d): a film stripping step of removing the water-soluble film from the surface to be transferred of the transfer object.

Advantageous Effects of Invention

According to the present invention, it is possible to provide a hydraulic transfer film capable of manufacturing a decorated molded product that expresses a design with a concavo-convex feeling by a hydraulic transfer method and a method for manufacturing a decorated molded product using the same.

DESCRIPTION OF EMBODIMENTS

Figure 1:
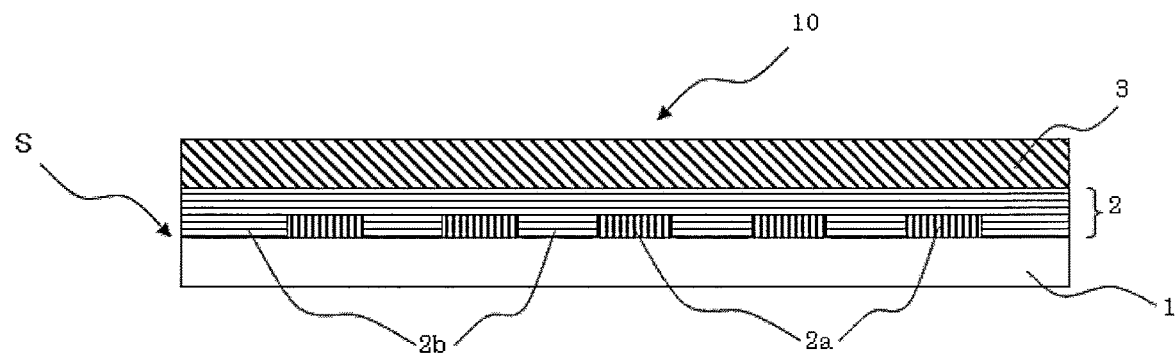
FIG. 1 is a diagrammatic cross-sectional view showing an example of a constitution of a hydraulic transfer film of the present invention.

The hydraulic transfer film of the present invention is hereunder described. FIG. 1 is a diagrammatic cross-sectional view showing an example of a constitution of the hydraulic transfer film of the present invention.

A hydraulic transfer film 10 of the present invention has a design layer 2 on a water-soluble film 1. The hydraulic transfer film 10 is characterized in that the design layer 2 has a low-gloss portion 2a and a high-gloss portion 2b; that the low-gloss portion 2a and the high-gloss portion 2b are present at least within an end face on the water-soluble film side of the design layer 2 (face designated as "S" in FIG. 1); that the low-gloss portion 2a contains a binder resin and a deglossing agent; and that the high-gloss portion 2b is composed of a resin composition containing an acrylic polymer polyol and/or a cured product thereof.

Incidentally, while FIGS. 1 to 4 show an embodiment in which the end face S of the design layer comes into contact with the water-soluble film 1, the low-gloss portion 2a and the high-gloss portion 2b in the hydraulic transfer film of the present invention have only to be present within the above-described end face S and are not needed to come into contact with the water-soluble film 1. For example, in the case where other layer is present between the water-soluble film 1 and the design layer 2, an embodiment in which the low-gloss portion 2a and the high-gloss portion 2b come into contact with the instant other layer also falls within the scope of the present invention. On the other hand, such an embodiment is distinguished from an embodiment wherein the low-gloss layer and the high-gloss layer are merely laminated on the water-soluble film 1.

Figure 2:
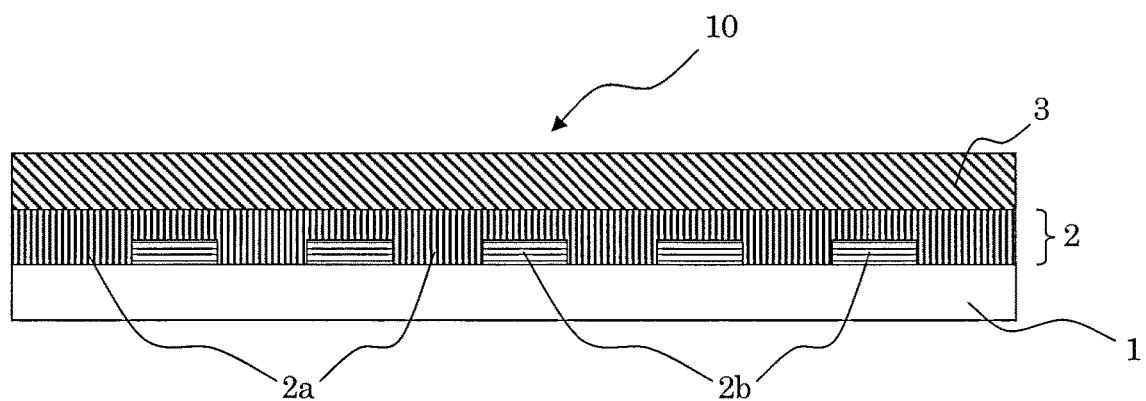
FIG. 2 is a diagrammatic cross-sectional view showing an example of a constitution of a hydraulic transfer film of the present invention.
Figure 3:
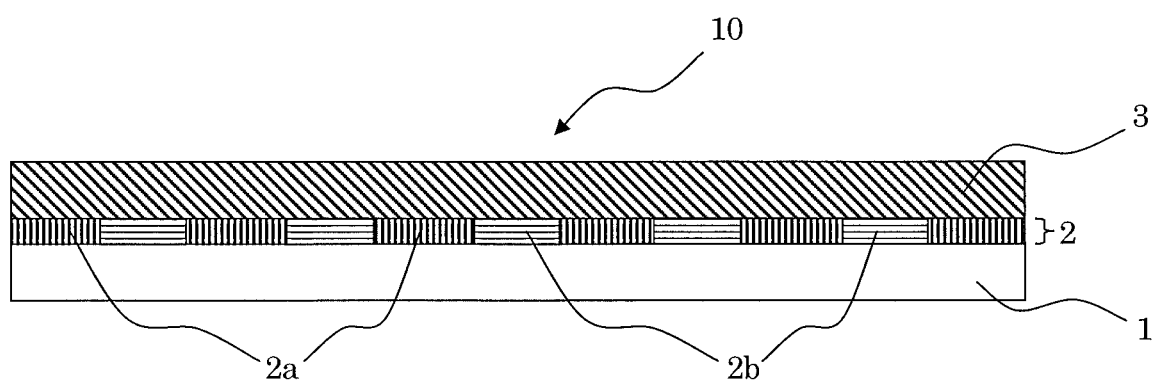
FIG. 3 is a diagrammatic cross-sectional view showing an example of a constitution of a hydraulic transfer film of the present invention.
Figure 4:
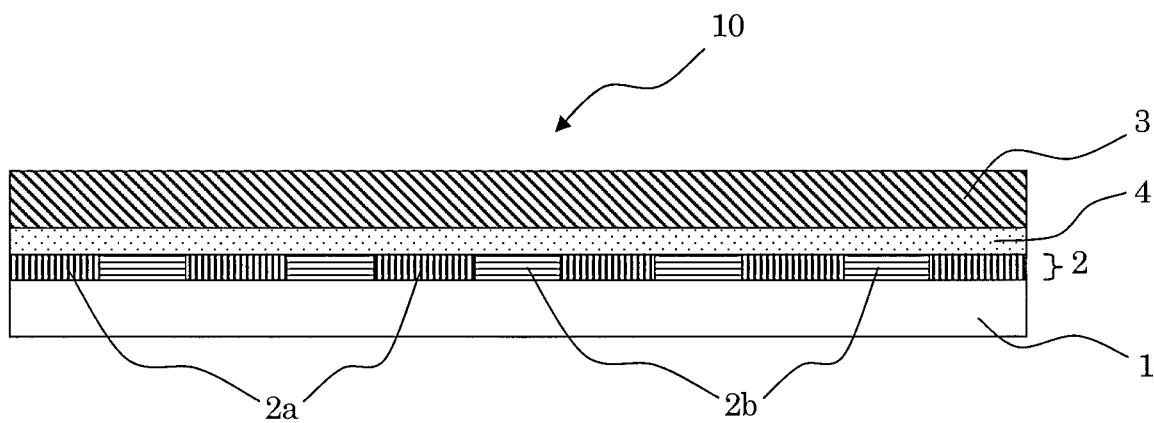
FIG. 4 is a diagrammatic cross-sectional view showing an example of a constitution of a hydraulic transfer film of the present invention.

More specifically, as shown in FIG. 1, the design layer 2 may be constituted of the low-gloss portion 2a formed in a pattern shape and the high-gloss portion 2b formed so as to cover the low-gloss portion 2a and also cover a region where the low-gloss portion 2a on the water-soluble film 1 is not provided; and as shown in FIG. 2, the design layer 2 may be constituted of the high-gloss portion 2b formed in a pattern shape and the low-gloss portion 2a formed so as to cover the high-gloss portion 2b and also cover a region where the high-gloss portion 2b on the water-soluble film 1 is not provided. Furthermore, as shown in FIGS. 3 and 4, the design layer 2 may also be constituted of the low-gloss portion 2a formed in a pattern shape and the high-gloss portion 2b formed so as to cover at least a part of a region where the low-gloss portion 2a is not provided. Above all, the embodiments shown in FIGS. 1, 3 and 4 are preferable from the viewpoint of design properties because the low-gloss portion 2a is readily recognized visually as a concave part.

In addition, as shown in FIGS. 1 to 4, in the hydraulic transfer film 10 of the present invention, a pattern layer 3 may be provided on the design layer 2 as the need arises, and as shown in FIG. 4, a primer layer 4 and a pattern layer 3 may be provided on the design layer 2 as the need arises.

When a decoration is applied to a transfer object by using the hydraulic transfer film 10 of the present invention, in view of the fact that the water-soluble film 1 is removed, the low-gloss portion 2a and the high-gloss portion 2b present on the end face S of the design layer 2 are exposed, whereby a gloss mat (gloss difference) design is revealed. According to this, a region where the low-gloss portion 2a is formed is seen as a concave part, thereby enabling a design with a three-dimensional feeling to impart to a decorated molded product.

[Water-soluble Film]

The water-soluble film 1 in the present invention has only to be a film being water-soluble or water-swelling, and it can be properly selected and used among water-soluble films which are generally used in conventional hydraulic transfer films.

Examples of the resin constituting the water-soluble film 1 include various water-soluble polymers such as polyvinyl alcohol resins, dextrin, gelatin, glue, casein, shellac, gum arabic, starches, proteins, polyacrylamide, sodium polyacrylate, polyvinyl methyl ether, a copolymer of methyl vinyl ether and maleic anhydride, a copolymer of vinyl acetate and itaconic acid, polyvinylpyrrolidone, acetyl cellulose, acetyl butyl cellulose, carboxymethyl cellulose, methyl cellulose, hydroxyethyl cellulose, sodium alginate, etc. These resins may be used solely or may be used in admixture of two or more kinds thereof. Incidentally, a rubber component such as mannan, xanthan gum, guar gum, etc. may be added for the water-soluble film 1.

Especially, from the standpoints of production stability, solubility in water and economy, among the above-described water-soluble films 1, a polyvinyl alcohol (PVA)-based resin film is preferable. Incidentally, the polyvinyl alcohol-based resin film may contain an additive such as starches, rubbers, etc. in addition to PVA.

As for the polyvinyl alcohol-based resin film, by changing a degree of polymerization and a degree of saponification of polyvinyl alcohol, a compounding amount of an additive such as starches, rubbers, etc., or the like, it is possible to properly adjust mechanical strength necessary for forming a printed layer for transfer on the water-soluble film, resistance to humidity during handling, a rate of softening due to water absorption after floating on the water surface, a time required for spreading or diffusion in water, easiness of deformation in the transfer step, or the like.

The water-soluble film composed of a polyvinyl alcohol-based resin film is suitably one as described in JP-A 54-92406, and for example, one composed of a mixed formulation of 80% by mass of a PVA resin, 15% by mass of a polymer water-soluble resin, and 5% by mass of a starch and having an equilibrium moisture content of about 3% is suitable.

In addition, though the polyvinyl alcohol-based resin film is soluble in water, it is preferable that the polyvinyl alcohol-based resin film endures as a film at the pre-stage of dissolution in water while it is swollen in water and softened. This is because by performing the hydraulic transfer at the time when the polyvinyl alcohol-based resin film endures as a film, it is possible to prevent excessive flowing or deformation of each of the layers for transfer at the time of hydraulic transfer.

A thickness of the water-soluble film 1 is preferably from 10 to 100 μm. When the thickness of the water-soluble film 1 is 10 μm or more, not only uniformity of the film is good, but production stability is high. On the other hand, when it is 100 μm or less, not only solubility in water is appropriate, but printability is excellent. From the foregoing viewpoints, the thickness of the water-soluble film 1 is more preferably in the range of from 20 to 60 μm.

Incidentally, the above-described water-soluble film 1 can also be used by being laminated with a base material having water permeability, for example, paper, a nonwoven fabric, a cloth, etc. However, when such a base material having water permeability and a water-soluble film having water solubility or water-swelling properties are laminated, it is preferable to make the constitution such that before floating the hydraulic transfer film on the water surface, the above-described base material having water permeability is separated from the water-soluble film having water solubility or water-swelling properties, or that the above-described base material having water permeability is separated from the water-soluble film having water solubility or water-swelling properties by the action of water after floating the hydraulic transfer film on the water surface.

[Design Layer]

As described previously, in the hydraulic transfer film of the present invention, the design layer 2 is provided on the water-soluble film 1, and the low-gloss portion 2a and the high-gloss portion 2b are present within the end face S on the water-soluble film side of the design layer 2. In the case of manufacturing a decorated molded product by using this hydraulic transfer film, a low-gloss region is formed in a just above part of the low-gloss portion 2a or a just above part and its neighborhood (hereinafter sometimes referred to simply as "just above part and its neighborhood"). That is, the low-gloss portion 2a has a function to reveal low gloss in a part (just above part of the low-gloss portion 2a and its neighborhood) of the decorated molded product.

A gloss mat design of the decorated molded product obtained by using the hydraulic transfer film 10 of the present invention is caused due to the fact that a difference in degree of gloss is generated between the low-gloss region in the low-gloss portion 2a and a high-gloss region of the surroundings thereof (a just above part of the high-gloss portion 2b or a just above part and its neighborhood).

The low-gloss region in the low-gloss portion 2a is recognized visually as a concave part, whereas the high-gloss region in the high-gloss portion 2b is recognized as a convex part, and therefore, the whole is recognized visually as a concavo-convex pattern by these low-gloss region and high-gloss region.

<Low-gloss Portion>

The low-gloss portion 2a contains a binder resin and a deglossing agent as described below.

(Binder Resin)

As the binder resin which is contained in the low-gloss portion 2a, there are exemplified thermoplastic resins. Specific examples thereof include acrylic resins, polyester resins such as alkyds, etc., unsaturated polyester resins, urethane resins (for example, polyester urethane-based resins), polycarbonate resins, vinyl chloride-vinyl acetate copolymers, polyvinyl acetals (butyral-based resins) such as polyvinyl butyral, etc., nitrocellulose-based resins such as cellulose nitrate, etc. In order to adjust a degree of revealment of the low-gloss region, or a contrast of the gloss difference between the low-gloss region and the high-gloss region, one or more kinds of these resins may be mixed as the need arises, and it should not be construed that the binder resin is limited thereto.

As the above-described binder resin, the same resin as that used for the high-gloss portion 2b as described later, namely a resin composed of an acrylic polymer polyol as a main component, can be used; however, it is preferable that a content of such a resin is low. This is because a high gloss difference can be generated by using resin systems different from each other between the high-gloss portion 2b and the low-gloss portion 2a. Specifically, a ratio of the resin which is used for the high-gloss portion 2b is preferably 5% by mass or less, more preferably 3% by mass or less, and most preferably to or less by mass relative to the binder resin. So long as the ratio of the resin which is used for the high-gloss portion 2b remains within such an extent, the advantageous effects of the present invention are not significantly impaired.

In addition, for the purpose of improving physical properties, an ionizing radiation curable resin, a thermosetting resin, or a curing agent thereof (e.g., isocyanates, etc.) can be further added to the above-described binder resin to an extent of not impairing moldability, as the need arises.

For example, in the case where it is intended to express a wood grain pattern by the pattern layer 3 as described later, a pattern in which a vessel portion becomes visually a concave part due to a gloss difference by allowing the low-gloss portion 2a to conform to a vessel portion of the wood grain is obtained.

(Deglossing Agent)

Specific examples of the deglossing agent include inorganic fillers selected from silica, clay, heavy calcium carbonate, light calcium carbonate, precipitated barium sulfate, calcium silicate, a synthetic silicate, and a silicic acid fine powder; and organic fillers selected from an acrylic resin, a urethane resin, a nylon resin, a polypropylene resin, and a urea-based resin. These deglossing agents may be used solely or may be used in combination of two or more kinds thereof.

A volume average particle diameter of the deglossing agent is preferably from 0.5 to 25 μm, more preferably from 1 to 15 μm, and still more preferably from 3 to 10 μm. When the volume average particle diameter of the deglossing agent is 25 μm or less, in view of the fact that an interfacial area increases, a stress at the time of processing is diffused, and voids or the like generated on the interface absorb energy, or a particle-to-particle distance becomes small to cause plastic deformation in the particles or among the voids, whereby whitening at the time of stretching can be suppressed. In addition, it is preferable that the volume average particle diameter of the deglossing agent is 0.5 μm or more from the viewpoint of a deglossing effect. Incidentally, the volume average particle diameter as referred to herein means a particle diameter at an integrated value of 50% in the particle size distribution determined by the laser diffraction/scattering method.

From the viewpoint of a balance between gloss mat effect and molding processability, a content of the deglossing agent in the low-gloss portion 2a is preferably from 0.5 to 50% by mass, more preferably from 10 to 50% by mass, and still more preferably from 25 to 50% by mass.

An oil absorption of the deglossing agent as measured in conformity with JIS K5101-13-1:2004 is preferably from 150 to 400 mL/100 g, more preferably from 180 to 350 mL/100 g, and still more preferably from 230 to 300 mL/100 g. From the viewpoint of a deglossing g effect, it is preferable to use the deglossing agent having an oil absorption of 150 mL/100 g or more, and from the viewpoint of keeping appropriate thixotropy not to impair coatability on the occasion of forming the low-gloss portion 2a, it is preferable to use the deglossing agent having an oil absorption of 400 mL/100 g or less.

Incidentally, by subjecting the above-described deglossing agent to a surface treatment, adhesion between the binder resin and the deglossing agent is improved, whereby when cured, a tough coating film can be formed. Such a surface treatment is preferable because a crack or whitening at the time of molding processing can be suppressed. A technique of the treatment is not particularly limited so long as the above-described effects are brought, and the treatment may be either a surface treatment with an organic material or a surface treatment with an inorganic material. Especially, there are suitably exemplified a silane coupling treatment and the like.

In addition, for the purpose of enhancing design properties, a coloring agent can be added in the low-gloss portion 2a, if desired. The coloring agent is not particularly limited, and any coloring agent which is used for the hydraulic transfer method can be used. Specifically, the same coloring agent as that used in the pattern layer as described later can be used.

A thickness of the low-gloss portion 2a is preferably from 0.5 to 30 μm, more preferably from 1 to 20 μm, and still more preferably from 1 to 10 μm.

<High-gloss Portion>

The hydraulic transfer film of the present invention is characterized by using a resin composition containing an acrylic polymer polyol or a cured product thereof for the high-gloss portion 2b. Although the cured product may be a completely cured product, it is preferably in a semi-cured state taking into consideration transfer processability and the like. In addition, one in a state where a resin composition containing an acrylic polymer polyol and a cured product of the resin composition are mixed is also a preferred embodiment.

In addition, the resin composition that forms the high-gloss portion 2b can further contain an isocyanate in addition to the acrylic polymer polyol. The isocyanate is a curing agent of the acrylic polymer polyol, and by containing the isocyanate, at least a part of the resin composition is made in a cured state or semi-cured state. According to this, it is possible to suppress excessive spreading which is easily generated by dissolution or swelling of the hydraulic transfer film in the step of floating the hydraulic transfer film on the water surface at the time of manufacturing a decorated molded product.

(Acrylic Polymer Polyol)

As for the above-described acrylic polymer polyol, a weight average molecular weight converted by standard polystyrene and determined by the gel permeation chromatography (GPC) is preferably from 1,000 to 100,000, more preferably from 5,000 to 80,000, and especially preferably from 20,000 to 50,000. When the molecular weight of the acrylic polymer polyol is 1,000 or more, solvent resistance is improved, so that on the occasion of forming the pattern layer 3, faults such as dissolution of the high-gloss portion 2b, etc. are hardly caused; whereas when it is 100,000 or less, on the occasion of forming an ink, the viscosity is lowered, or gelation is hardly caused, so that workability is improved.

In addition, a hydroxyl value of the acrylic polymer polyol is preferably from 30 to 130 mgKOH/g, more preferably from 50 to 130 mgKOH/g, and still more preferably from 60 to 120 mgKOH/g. It is preferable that the hydroxyl value of the acrylic polymer polyol is 30 mgKOH/g or more from the standpoint that excessive spreading of the whole of the hydraulic transfer film can be suppressed; and when it is 130 mgKOH/g or less, flexibility of the high-gloss portion 2b becomes good, and faults such as a crack, etc. are not caused. Incidentally, the above-described hydroxyl value can be measured by the acetylation method using acetic anhydride.

(Isocyanate)

The isocyanate has only to be a polyvalent isocyanate having two or more isocyanate groups in a molecule thereof, and polyisocyanates, for example, aromatic isocyanates such as 2,4-tolylene diisocyanate (TDI), xylene diisocyanate (XDI), naphthalene diisocyanate, 4,4'-diphenylmethane diisocyanate, etc.; or aliphatic (or alicyclic) isocyanates such as 1,6-hexamethylene diisocyanate (HMDI), isophorone diisocyanate (IPDI), methylene diisocyanate (MDI), hydrogenated tolylene diisocyanate, hydrogenated diphenylmethane diisocyanate, etc. are used.

From this fact, as for the high-gloss portion 2b, as shown in FIG. 1, an embodiment which includes the design layer 2 which is constituted of the low-gloss portion 2 formed in a pattern shape and the high-gloss portion 2b formed so as to cover the low-gloss portion 2a and also cover a region where the low-gloss portion 2a on the water-soluble film 1 is not provided is more preferable from the standpoint that it is possible to suppress excessive spreading of the whole of hydraulic transfer film.

In addition, a block isocyanate in which an isocyanate group is deactivated by protection with a proper blocking agent, and the isocyanate group is regenerated by heating may be used as the need arises. As the blocking agent, for example, known blocking agents such as phenol, alcohols, active methylene compounds, e.g., dimethyl malonate, ethyl acetoacetate, etc., oximes, etc. may be used.

By using the block isocyanate, higher moldability can be imparted to the high-gloss portion 2b, and after molding in a desired shape, by heat treating the molded product, regenerating the isocyanate group, and then allowing the resultant to react with a polyol, followed by curing, good adhesion with the low-gloss portion 2a and the pattern layer 3 can be revealed.

It is preferable that a resin composition that constitutes the above-described high-gloss portion 2b contains a urethane resin, a (meth)acrylic resin, a (meth)acrylic/urethane copolymer resin, a vinyl chloride-vinyl acetate copolymer, a polyester resin, a butyral resin, chlorinated polypropylene, chlorinated polyethylene, or the like. This is because it is possible to make the high-gloss portion 2b flexible, thereby improving transfer processability at the time of manufacturing a decorated molded product. Incidentally, the term "(meth) acrylic" as referred to herein means acrylic or methacrylic.

Of these, especially, a urethane resin is preferable because of high compatibility with the acrylic polymer polyol.

In addition, a coloring agent may be added for the above-described high-gloss portion 2b within the range where the advantageous effects of the present invention are not impaired. As the coloring agent, the same coloring agent as that used for the pattern layer as described later can be used.

(Urethane Resin)

As the urethane resin, it is preferable to select a non-crosslinking type urethane resin, namely a urethane resin that is not a resin having a network three-dimensional molecular structure through three-dimensional crosslinking but a thermoplastic resin having a linear molecular structure. As such a non-crosslinking type urethane resin, a non-crosslinking type urethane resin obtained by using a polyol such as a polyester polyol, a polyether polyol, polycarbonate polyol, a polycaprolactone polyol, polyethylene glycol, polypropylene glycol, etc. as a main agent for the polyol component and allowing it to react with an isocyanate can be used; and a non-crosslinking type urethane resin synthesized from a combination of a polyester polyol with an isocyanate such as hexamethylene diisocyanate, etc. is especially preferable from the viewpoints of moldability, heat resistance, weather resistance, adhesion to the low-gloss portion 2a, and the like. In general, the number of hydroxyl group in one molecule of the polyol and the number of isocyanate group in one molecule of the isocyanate are 2 in average, respectively.

In addition, a urethane urea resin synthesized from a combination of a polyol component, a polyamine component, and an isocyanate is preferably used as the urethane resin; and as the polyol component and the isocyanate, those described previously can be used.

As the urethane resin, one having a glass transition point of 100° C. or lower is preferable, and one having a glass transition point of from 20 to 100° C. is more preferable. When the glass transition point of the urethane resin is 100° C. or lower, flexibility of the high-gloss portion 2b at ordinary temperature is excellent, whereas when it is 20° C. or higher, a cohesive force is not remarkably lowered by heating, or the high-gloss portion 2b is not dissolved in water at the time of hydraulic transfer, and hence, such is preferable.

In a resin composition that constitutes the high-gloss portion 2b, a ratio of a total amount of the acrylic polymer polyol or the isocyanate, which is added to the acrylic polymer polyol as the need arises, to the urethane resin is generally from 99/1 to 50/50, preferably from 95/5 to 50/50, more preferably from 90/10 to 60/40, and especially preferably from 80/20 to 68/32 in terms of a mass ratio. When the ratio of the urethane resin is high, transfer processability is improved; however, when the instant ratio is excessively high, there is a concern that design properties are inferior. Especially, in the case where the content of the isocyanate is high, it is preferable from the standpoint of transfer processability that the ratio of the urethane resin is made high.

The high-gloss portion 2b can be formed by coating a coating solution in which the acrylic polymer polyol, the isocyanate, the urethane resin, and other resins as described above are dissolved in a solvent by a known method, followed by performing drying and curing as the need arises. A thickness of the high-gloss portion 2b is generally in the range of from about 0.5 to 20 µm, and preferably in the range of from 1 to 5 µ.m.

[Pattern Layer]

In the present invention, if desired, the pattern layer 3 can be provided on the design layer 2. In general, the pattern layer 3 contains a binder resin and a coloring agent. As the binder resin of the pattern layer 3, the same binder resin as that used for the low-gloss portion 2a is exemplified.

As the coloring agent, inorganic pigments such as carbon black (sumi), iron black, titanium white, antimony white, chrome yellow, titanium yellow, red iron oxide, cadmium red, ultramarine blue, cobalt blue, etc.; organic pigments or dyes such as quinacridone red, isoindolinone yellow, phthalocyanine blue, etc.; metallic pigments composed of a flaky foil piece of aluminum, bronze, etc.; pearlescent (pearl) pigments composed of a flaky foil piece of titanium dioxide-coated mica, basic lead carbonate, etc.; and the like are used.

[Primer Layer]

In the present invention, if desired, a primer layer 4 can be provided between the design layer 2 and the pattern layer 3 (see FIG. 4).

As a resin for forming the primer layer 4, the same binder resin as that contained in the low-gloss portion 2a is exemplified. Similar to the high-gloss portion 2b, the primer layer 4 can be, for example, formed by coating a coating solution of the binder resin in a solvent by a known method, or other means.

[Manufacturing Method of Hydraulic Transfer Film]

The hydraulic transfer film 10 of the present invention as shown in FIG. 1 can be, for example, manufactured by a step (A) of forming the low-gloss portion 2a in a pattern shape on the water-soluble film 1; a step (B) of forming the high-gloss portion 2b so as to cover the low-gloss portion 2a and also cover a region where the low-gloss portion 2a on the water-soluble film 1 is not provided, thereby making the design layer 2; and a step (C) of forming the pattern layer 3 on the design layer 2 as the need arises.

In the step (A), the low-gloss portion 2a can be formed in a pattern shape by a known printing method, and for example, it can be formed by applying gravure printing, and preferably gravure offset printing, by using an ink containing a binder resin and a deglossing agent and a gravure plate material having a cell shape of columnar concave part.

In the step (B), the high-gloss portion 2b can be formed by a known coating method or printing method, or formed by laminating a resin film on the low-gloss portion 2a. Examples of the coating method include gravure coating, reverse coating, and the like, and examples of the printing method include gravure printing and the like.

A method for forming the pattern layer 3 in the step (C) is the same as the coating method or printing method in the step (B). The pattern layer 3 may be a full solid print.

The hydraulic transfer film 10 of the present invention as shown in FIG. 2 can be, for example, manufactured by the same method as that described above, except for changing the low-gloss portion 2a and the high-gloss portion 2b to each other.

The hydraulic transfer film 10 of the present invention as shown in FIG. 3 can be, for example, manufactured by a step (A) of forming the low-gloss portion 2a in a pattern shape on the water-soluble film 1; a step (B) of forming the high-gloss portion 2b so as to cover at least a part of a region where the low-gloss portion 2a on the water-soluble film 1 is not provided, thereby making the design layer 2; and a step (C) of forming the pattern layer 3 on the design layer 2 as the need arises. In addition, by providing a step of forming a primer layer on the design layer 2 between the step (B) and the step (C) described above, the hydraulic transfer film 10 of the present invention as shown in FIG. 4 can also be manufactured.

[Manufacturing Method of Decorated Molded Product]

A decorated molded product can be manufactured by using the hydraulic transfer film of the present invention through the following steps (a) to (d).

Step (a): a step of floating the hydraulic transfer film 10 on the water surface such that the water-soluble film 1 side faces on the water surface.

Step (b): a step of coating an activator composition on the design layer 2 side (or the pattern layer 3 side) of the hydraulic transfer film 10.

Step (c): a step of pressing a transfer object onto the hydraulic transfer film 10 having gone through the steps (a) and (b) and bringing the design layer 2 (further the primer layer 4 or the pattern layer 3 as the need arises) into intimate contact with the surface to be transferred of the transfer object by a hydraulic pressure.

Step (d): a film stripping step of removing the water-soluble film 1 from the surface to be transferred of the transfer object.

In addition, after the above-described step (d), the following step (e) may be included.

Step (e): a step of forming a topcoat layer on the surface to be transferred of the transfer object.

<Step (a)>

The step (a) can be performed before or after the step (b). The hydraulic transfer film 10 is floated on the water surface such that the water-soluble film 1 side faces on the water surface side. In order to float the hydraulic transfer film 10 on the water surface, a sheet-fed printed matter may be floated one by one, or the hydraulic transfer film 10 in a continuous strip state may be continuously fed and floated on the water surface while allowing water to flow in one direction.

<Step (b)>

The step (b) can be performed before or after the step (a) and is a step of coating an activator composition on the design layer 2 side (or the pattern layer 3 side). By coating the activator composition in this step, at least a part of the design layer 2 or the pattern layer 3 is softened (activated) by being dissolved or swollen, so that it becomes easy to come into intimate contact with the transfer object.

(Activator Composition)

The activator composition is not particularly limited so long as it is a composition having a function to activate the design layer 2 or the pattern layer 3 to transfer it onto the surface to be transferred of the transfer object. In addition, it is preferable that the activator composition has such properties that it does not vaporize until each of the layers is transferred onto the surface to be transferred of the transfer object. As such an activator composition, for example, a composition containing an ester, an acetylene glycol, a ketone, an ether, an extender pigment, and a resin is preferably exemplified.

Preferred examples of the ester include ethyl acetate, propyl acetate, butyl acetate, isobutyl acetate, sec-butyl acetate, tert-butyl acetate, dibutyl oxalate, dibutyl phthalate, dimethyl phthalate, dioctyl phthalate, diisooctyl phthalate, and the like.

Preferred examples of the acetylene glycol include methoxybutyl acetate, ethoxybutyl acetate, ethyl carbitol acetate, propyl carbitol acetate, butyl carbitol acetate, and the like.

Preferred examples of the ketone include acetone, methyl ethyl ketone, methyl isobutyl ketone, dibutyl ketone, diisobutyl ketone, cyclohexanone, methyl cyclohexanone, isophorone, and the like.

Preferred examples of the ether include methyl cellosolve, butyl cellosolve, isoamyl cellosolve, and the like.

Preferred examples of the extender pigment include precipitated barium sulfate, silica, and the like.

In addition, preferred examples of the resin include thermoplastic resins such as homopolymers or copolymers of an acrylate-based monomer, etc.; thermosetting resins such as polyamide resins, polyester resins, phenol resins, melamine resins, urea resins, epoxy resins, phthalate alkyd resins, diallyl phthalate resins, alkyd resins, polyurethane resins, etc.; and the like, with thermosetting resins being especially preferred.

Preferred content of each formulation of the activator composition which is used in the present invention is as follows: approximately, from 5 to 40% by mass for the ester, from 40 to 80% by mass for the acetylene glycol, from 5 to 30% by mass for the ether, and from 1 to 20% by mass for the resin.

The hydraulic transfer film of the present invention contains an acrylic polymer polyol or a cured product thereof in the high-gloss portion. The acrylic polymer polyol has relatively rigid properties and has a tendency such that on the occasion of hydraulic transfer, it is hardly stretched. Therefore, when the hydraulic transfer is performed similar to the conventional hydraulic transfer film, the high-gloss portion containing an acrylic polymer polyol or a cured product thereof is transferred in a state where it is not thoroughly activated. For that reason, for example, on the occasion of hydraulic transfer onto a transfer object having an extremely complicated shape such as that in the case of a large curvature as in an automotive steering wheel, etc., a pattern cannot be thoroughly transferred onto the transfer object, so that there is a concern that throwing power properties are slightly unsatisfactory.

In such case, the throwing power properties can be improved by using butyl carbitol acetate or isophorone as a main component of the activator composition. Specifically, an activator composition that meets at least one of requirements of (i) containing 70% by mass or more of butyl carbitol acetate, (ii) containing 55% by mass or more of isophorone, (iii) containing 30% by mass or more of isophorone and further containing 0% by mass or more and 70% by mass or less of butyl carbitol acetate, with a total content of these compounds being 55% by mass or more, and (iv) containing more than 0% by mass and less than 30% by mass of isophorone and further containing 45% by mass or more and less than 100% by mass of butyl carbitol acetate, with a total content of these compounds being 75% by mass or more, is especially suitable on the occasion of performing hydraulic transfer onto a transfer object having an extremely complicated shape, such as a member having a large curvature, etc., by using the hydraulic transfer film of the present invention.

Coating of the activator composition may be performed by a gravure printing or spray coating method, or other methods, and its coating amount is generally from 1 to 50 g/m$^2$, preferably from 3 to 30 g/m$^2$, and more preferably from 10 to 20 g/m$^2$.

<Step (c)>

The step (c) is a step of pressing a transfer object onto the hydraulic transfer film 10 having gone through the steps (a) and (b) and bringing at least the design layer 2 into intimate contact with the surface to be transferred of the transfer object by a hydraulic pressure. In the case where the hydraulic transfer film 10 further contains the primer layer 4 or the pattern layer 3, the primer layer 4 or the pattern layer 3 is also transferred simultaneously together with the design layer 2.

As for the water for floating the hydraulic transfer film 10 and impressing a hydraulic pressure, it is desirable to properly adjust a water temperature according to the kind of the water-soluble film 1 of the hydraulic transfer film 10, or the like, and the water temperature is preferably from about 25 to 50° C., and more preferably from 25 to 35° C.

In addition, a transfer time of the hydraulic transfer film 10 of the present invention onto the transfer object is preferably from about 20 to 120 seconds, and more preferably from about 30 to 60 seconds.

(Transfer Object)

As the transfer object, for example, structures made of a resin such as a polystyrene resin, an acrylonitrile-butadiene-styrene copolymer (ABS resin), a polycarbonate resin, a melamine resin, a phenol resin, a urea resin, a fiber-based resin, polyethylene, polypropylene, etc., or a mixed resin thereof, and alternatively, a metal such as iron, aluminum, copper, etc., a porcelain ware, glass, a ceramic such as an enamelware, etc., or a material such as a wood, etc., can be used.

In addition, a shape of the surface to be transferred may be a two-dimensional shape being a planar shape or may be a three-dimensional such as a concavo-convex shape, a curved shape, etc. Of these, in general, a resin-made structure is frequently used. In this resin-made structure, there may be the case where not only a release agent attaches at the time of molding, but a dust or grease, or the like also attaches, and therefore, in order to transfer each of the layers of the hydraulic transfer film with good adhesion, it is preferable to previously clean up the surface to be transferred with a degreasing liquid.

In the step (c), by bringing the activator composition coated on the design layer 2 side (or the pattern layer 3 side) into contact with the transfer object, thereby dissolving the surface of the transfer object, the adhesion between the hydraulic transfer film 10 of the present invention and the transfer object can be made more favorable.

<Film Stripping Step (d)>

The film stripping step (d) is a step which is performed after the step (c) and in which the water-soluble film 1 is removed from the surface to be transferred of the transfer object.

The removal of the water-soluble film 1 attaching onto the surface to be transferred of the transfer object can be, for example, performed by shower washing with water. Incidentally, while a condition of shower washing varies with a material that forms the water-soluble film 1, and the like, in general, a water temperature is preferably from about 15 to 60° C., and a washing time is preferably from about 10 seconds to 5 minutes. Then, after the step (d), if the transfer object is thoroughly dried to vaporize the moisture, a resin molded product to which a gloss mat design has been imparted due to a gloss difference between the low-gloss portion 2a and the high-gloss portion 2b transferred onto the surface to be transferred of the transfer object is obtained.

<Step (e)>

The step (e) is a step of forming a topcoat layer on the surface to be transferred of the transfer object as the need arises.

In the step (e), the design layer which has been transferred onto the surface to be transferred of the transfer object in the above-described step (d) is subjected to coating for the purpose of an improvement of surface strength, protection of the surface, adjustment of gloss on the surface, or the like as the need arises, thereby forming a transparent or semi-transparent topcoat layer.

As a material that forms this topcoat layer, for example, thermoplastic resins, thermosetting resins, ultraviolet curing resins, and the like are selected, and specifically, urethane-based resins, epoxy resins, acrylic resins, fluorine-based resins, silicon-based resins, and the like are used. Formation of the topcoat layer can be performed by using a coating material obtained by dissolving the above-describe resin in a known organic solvent by a known coating method such as spray coating, electrostatic coating, brush coating, dip coating, etc. In addition, a thickness of the topcoat layer is preferably from 1 to 25 μm, and more preferably from 1 to 10 μm.

EXAMPLES

Next, the present invention is described in more detail by reference to the following Examples, but it should not be construed that the present invention is limited to these Examples.

Incidentally, with respect to a decorated molded product using a hydraulic transfer film obtained in each of the Examples, the following performance evaluations were performed.

(1) Transfer Processability (Part 1):

With respect to each of hydraulic transfer films obtained in the Examples and Comparative Examples, the surface of a pattern layer thereof was coated with 10 g/m² of an activator composition having a formulation as described below; the resulting transfer film was floated on the water surface such that the water-soluble film side faced on the water surface side; thereafter, a transfer object (one obtained by providing a flat member of 10 mm×20 mm×1 mm with a 160°-flex part (in a straight-line state) as a complicated shape site and having a relatively light flex part) was pressed on the hydraulic transfer film; and after going through a transfer step of bringing a design layer and a pattern layer each composed of a low-gloss portion and a high-gloss portion into intimate contact with the surface to be transferred of the transfer object by means of a hydraulic pressure, a film stripping step of removing the water-soluble film from the surface to be transferred of the transfer object was performed. In the thus obtained decorated molded product, the design layer composed of the low-gloss portion and the high-gloss portion was exposed on the outermost surface. A surface state of the obtained decorated molded product was observed through visual inspection and evaluated according to the following criteria. The results are shown in Table 1.

(Formulation of Activator Composition 1)

| Phthalate-based alkyd resin: | 6 parts by mass |
| Micro silica (extender pigment): | 2 parts by mass |
| Dibutyl phthalate: | 17 parts by mass |
| Solvent (butyl carbitol acetate): | 60 parts by mass |
| Solvent (butyl cellosolve): | 15 parts by mass |

(Evaluation Criteria)

A: Extensibility was good, and follow-up properties to the complicated shape site were extremely good.

B: Follow-up properties to the complicated shape site were good.

C: Although follow-up properties to the complicated shape site were insufficient, follow-up properties to other sites were good.

D: Although the transfer was possible, on the occasion of floating on the water surface, stretching was poor, and on the occasion of transfer, wrinkles were formed in an end part of the transfer object.

(2) Transfer Processability (Part 2):

The same operations as those in the above-described (1) transfer processability (part 1) were followed, except that with respect to a hydraulic transfer film obtained in Example 8, the transfer object was changed to a member with a large curvature in a columnar shape having a diameter of 35 mm and a length of 250 mm, and the activator composition was changed to each of the following activator compositions 2 to 5, thereby fabricating decorated molded products (decorated molded products of Examples 8-2 to 8-5, respectively), followed by performing the evaluations through visual inspection. The results are shown in Table 2.

| (Formulation of active composition 2) | |
|---|---|
| Solvent (butyl carbitol acetate): | 80 parts by mass |
| Solvent (butyl cellosolve): | 20 parts by mass |
| (Formulation of active composition 3) | |
| Solvent (isophorone): | 60 parts by mass |
| Solvent (butyl cellosolve): | 40 parts by mass |
| (Formulation of active composition 4) | |
| Solvent (isophorone): | 40 parts by mass |
| Solvent (butyl carbitol acetate): | 20 parts by mass |
| Solvent (butyl cellosolve): | 40 parts by mass |

-continued (Formulation of active composition 5)

| | |
|---|---|
| Solvent (isophorone): | 20 parts by mass |
| Solvent (butyl carbitol acetate): | 60 parts by mass |
| Solvent (butyl cellosolve): | 20 parts by mass |

(3) Design Properties (Gloss Mat Effect):

With respect to each of the decorated molded products obtained in the above-described (1) transfer processability (part 1) and (2) transfer processability (part 2), design properties of the surface thereof were evaluated through visual inspection. Evaluation criteria are as follows.

A: A vessel part was recognized as a concave part, and the design properties were high.

B: Although the design properties were slightly inferior, there was no problem from the standpoint of practical use.

C: A design was planar, and the design properties were extremely inferior.

Example 1

A PVA film (thickness: 40 μm) was used as a water-soluble film, and a 1 μm-thick low-gloss portion having a pattern conforming to a vessel part of a wood grain pattern as described later was formed in a part of one surface of the PVA film by means of gravure printing. For the formation of the low-gloss portion, an ink containing an acrylic polymer polyol (weight average molecular weight: 30,000, hydroxyl value: 80 mgKOH/g) that is a binder resin and silica (volume average particle diameter: 5 μm) that is a deglossing agent in a mass ratio of 1/1 was used.

Subsequently, an ink containing a resin composition containing an acrylic polymer polyol (weight average molecular weight: 30,000, hydroxyl value: 80 mgKOH/g, as described as the main resin in Table 1) and a curing agent (hexamethylene diisocyanate) such that an NCO equivalent and an OH equivalent were equal to each other was coated on the low-gloss portion, thereby forming a 2 μm-thick high-gloss portion.

Subsequently, a pattern layer having a wood grain pattern was formed by means of gravure printing so as to conform to the vessel part of a wood grain pattern of the above-described low-gloss portion, thereby obtaining a hydraulic transfer film. As for the pattern layer, a mixed resin of cellulose nitrate and an alkyd resin (a mass ratio of cellulose nitrate to the alkyd is 5/2) was used as a binder resin, and a coloring ink containing red iron oxide and carbon black in a prescribed compounding ratio was used as a coloring agent.

A decorated molded product using the obtained hydraulic transfer film was evaluated on the basis of the evaluations described above in the (1) transfer processability (part 1) and (3) design properties. The results are shown in Table 1.

Example 2

A hydraulic transfer film was obtained in the same manner as that in Example 1, except for using an acrylic resin as the binder resin for the low-gloss portion. A decorated molded product using the obtained hydraulic transfer film was evaluated on the basis of the evaluations described above in the (1) transfer processability (part 1) and (3) design properties. The results are shown in Table 1. Incidentally, the acrylic resin as used herein has a weight average molecular weight of 100,000, a hydroxyl value of 0 mgKOH/g, and a glass transition point of 105° C.

Example 3

A hydraulic transfer film was obtained in the same manner as that in Example 1, except for using a mixed resin of cellulose nitrate and an alkyd (a mass ratio of cellulose nitrate to the alkyd is 5/2) as the binder resin for the low-gloss portion. A decorated molded product using the obtained hydraulic transfer film was evaluated on the basis of the evaluations described above in the (1) transfer processability (part 1) and (3) design properties. The results are shown in Table 1.

Example 4

A hydraulic transfer film was obtained in the same manner as that in Example 3, except that the high-gloss portion was formed by using a mixed resin of an acrylic polymer polyol (weight average molecular weight: 30,000, hydroxyl value: 80 mgKOH/g) and hexamethylene diisocyanate, and a urethane urea (glass transition point: 40° C.), as described as the other resin in Table 1) in a mass ratio of 80/20. A decorated molded product using the obtained hydraulic transfer film was evaluated on the basis of the evaluations described above in the (1) transfer processability (part 1) and (3) design properties. The results are shown in Table 1.

Example 5

A hydraulic transfer film was obtained in the same manner as that in Example 3, except for using only an acrylic polymer polyol (weight average molecular weight: 30,000, hydroxyl value: 80 mgKOH/g) as the resin for forming the high-gloss portion. A decorated molded product using the obtained hydraulic transfer film was evaluated on the basis of the evaluations described above in the (1) transfer processability (part 1) and (3) design properties. The results are shown in Table 1.

Example 6

A hydraulic transfer film was obtained in the same manner as that in Example 5, except that the high-gloss portion was formed by using a mixed resin of an acrylic polymer polyol (weight average molecular weight: 30,000, hydroxyl value: 80 mgKOH/g) and a urethane urea resin (glass transition point: 40° C.) in a mass ratio of 95/5. A decorated molded product using the obtained hydraulic transfer film was evaluated on the basis of the evaluations described above in the (1) transfer processability (part 1) and (3) design properties. The results are shown in Table 1.

Example 7

A hydraulic transfer film was obtained in the same manner as that in Example 6, except that in Example 6, the mass ratio of the acrylic polymer polyol to the urethane urea resin was changed to 90/10. A decorated molded product using the obtained hydraulic transfer film was evaluated on the basis of the evaluations described above in the (1) transfer processability (part 1) and (3) design properties. The results are shown in Table 1.

Example 8

A hydraulic transfer film was obtained in the same manner as that in Example 6, except that in Example 6, the mass ratio of the acrylic polymer polyol to the urethane urea resin was changed to 80/20. A decorated molded product using the obtained hydraulic transfer film was evaluated on the basis of the evaluations described above in the (1) transfer processability (part 1) and (3) design properties. The results are shown in Table 1. In addition, the results obtained by evaluation on the basis of the evaluation described above in the (2) transfer processability (part 2) are shown in Table 2.

Example 9

A hydraulic transfer film was obtained in the same manner as that in Example 6, except that in Example 6, the mass ratio of the acrylic polymer polyol to the urethane urea resin was changed to 70/30. A decorated molded product using the obtained hydraulic transfer film was evaluated on the basis of the evaluations described above in the (1) transfer processability (part 1) and (3) design properties. The results are shown in Table 1.

Example 10

A hydraulic transfer film was obtained in the same manner as that in Example 6, except that in Example 6, the mass ratio of the acrylic polymer polyol to the urethane urea resin was changed to 65/35. A decorated molded product using the obtained hydraulic transfer film was evaluated on the basis of the evaluations described above in the (1) transfer processability (part 1) and (3) design properties. The results are shown in Table 1.

Comparative Example 1

A hydraulic transfer film was obtained in the same manner as that in Example 3, except that on the occasion of forming a low-gloss portion, an ink not containing a deglossing agent was used, and the high-gloss portion was not provided. A decorated molded product using the obtained hydraulic transfer film was evaluated on the basis of the evaluations described above in the (1) transfer processability (part 1) and (3) design properties. The results are shown in Table 1.

Comparative Example 2

A hydraulic transfer film was obtained in the same manner as that in Example 3, except that the high-gloss portion was not provided. A decorated molded product using the obtained hydraulic transfer film was evaluated on the basis of the evaluations described above in the (1) transfer processability (part 1) and (3) design properties. The results are shown in Table 1.

Comparative Example 3

A hydraulic transfer film was obtained in the same manner as that in Example 3, except that the high-gloss portion was formed by using a mixed resin of cellulose nitrate and an alkyd (a mass ratio of cellulose nitrate to the alkyd is 5/2). A decorated molded product using the obtained hydraulic transfer film was evaluated on the basis of the evaluations described above in the (1) transfer processability (part 1) and (3) design properties. The results are shown in Table 1.

Comparative Example 4

A hydraulic transfer film was obtained in the same manner as that in Example 3, except that the high-gloss portion was formed by using an acrylic resin (glass transition point: 80° C.). A decorated molded product using the obtained hydraulic transfer film was evaluated on the basis of the evaluations described above in the (1) transfer processability (part 1) and (3) design properties. The results are shown in Table 1.

Comparative Example 5

A hydraulic transfer film was obtained in the same manner as that in Example 3, except that the high-gloss portion was formed by using a urethane urea resin (glass transition point: 40° C.). A decorated molded product using the obtained hydraulic transfer film was evaluated on the basis of the evaluations described above in the (1) transfer processability (part 1) and (3) design properties. The results are shown in Table 1.

TABLE 1

| | Low-gloss portion (parts by mass) | | High-gloss portion (parts by mass) | | | Evaluation results | |
|---|---|---|---|---|---|---|---|
| | Binder resin | Deglossing agent | Main resin | Curing agent | Other resin | Transfer processability (part 1) | Design properties |
| Example 1 | Acrylic polymer polyol *1 | Silica | Acrylic polymer polyol *1 | Isocyanate *2 | No | D | B |
| Example 2 | Acrylic resin *3 | Silica | Acrylic polymer polyol *1 | Isocyanate *2 | No | D | A |
| Example 3 | Cellulose nitrate/alkyd *4 | Silica | Acrylic polymer polyol *1 | Isocyanate *2 | No | C | A |
| Example 4 | Cellulose nitrate/alkyd *4 | Silica | Acrylic polymer polyol *1 (80) | Isocyanate *2 | Urethane urea resin *5 (20) | B | A |
| Example 5 | Cellulose nitrate/alkyd *4 | Silica | Acrylic polymer polyol *1 | No | No | B | A |
| Example 6 | Cellulose nitrate/alkyd *4 | Silica | Acrylic polymer polyol *1 (95) | No | Urethane urea resin *5 (5) | A | A |
| Example 7 | Cellulose nitrate/alkyd *4 | Silica | Acrylic polymer polyol *1 (90) | No | Urethane urea resin *5 (10) | A | A |
| Example 8 | Cellulose nitrate/alkyd *4 | Silica | Acrylic polymer polyol *1 (80) | No | Urethane urea resin *5 (20) | A | A |
| Example 9 | Cellulose nitrate/alkyd *4 | Silica | Acrylic polymer polyol *1 (70) | No | Urethane urea resin *5 (30) | A | A |
| Example 10 | Cellulose nitrate/alkyd *4 | Silica | Acrylic polymer polyol *1 (65) | No | Urethane urea resin *5 (35) | A | B |

TABLE 1-continued

| | Low-gloss portion (parts by mass) | | High-gloss portion (parts by mass) | | | Evaluation results | |
| | | | | | | Transfer | |
| | Binder resin | Deglossing agent | Main resin | Curing agent | Other resin | processability (part 1) | Design properties |
|---|---|---|---|---|---|---|---|
| Comparative Example 1 | Cellulose nitrate/alkyd *4 | No | No | No | No | A | C |
| Comparative Example 2 | Cellulose nitrate/alkyd *4 | Silica | No | No | No | A | C |
| Comparative Example 3 | Cellulose nitrate/alkyd *4 | Silica | No | No | Cellulose nitrate/alkyd *4 | A | C |
| Comparative Example 4 | Cellulose nitrate/alkyd *4 | Silica | No | No | Acrylic resin *6 | A | C |
| Comparative Example 5 | Cellulose nitrate/alkyd *4 | Silica | No | No | Urethane urea resin *5 | A | C |

*1 Acrylic polymer polyol; weight average molecular weight: 30,000, hydroxyl value: 80 mgKOH/g
*2 Isocyanate; hexamethylene diisocyanate
*3 Acrylic resin; hydroxyl value: 0 mgKOH/g, weight average molecular weight: 100,000, hydroxyl value: 0 mgKOH/g, glass transition point: 105° C.
*4 Cellulose nitrate/alkyd; a mixed resin of cellulose nitrate and alkyd in a mass ratio of 5/2
*5 Urethane urea resin; glass transition point: 40° C.
*6 Acrylic resin; glass transition point: 80° C.

TABLE 2

| | Low-gloss portion (parts by mass) | | High-gloss portion (parts by mass) | | | Evaluation results | |
| | | | | | | Transfer | |
| | Binder resin | Deglossing agent | Main resin | Curing agent | Other resin | processability (part 2) | Design properties |
|---|---|---|---|---|---|---|---|
| Example 8-2 | Cellulose nitrate/alkyd *4 | Silica | Acrylic polymer polyol *1 (80) | No | Urethane urea resin *5 (20) | A | A |
| Example 8-3 | Cellulose nitrate/alkyd *4 | Silica | Acrylic polymer polyol *1 (80) | No | Urethane urea resin *5 (20) | A | A |
| Example 8-4 | Cellulose nitrate/alkyd *4 | Silica | Acrylic polymer polyol *1 (80) | No | Urethane urea resin *5 (20) | A | A |
| Example 8-5 | Cellulose nitrate/alkyd *4 | Silica | Acrylic polymer polyol *1 (80) | No | Urethane urea resin *5 (20) | A | A |

As shown in Table 1, the decorated molded products fabricated using the hydraulic transfer films obtained in Examples 1 to 10 exhibit a good gloss mat design, and in the case of using acrylic polymer polyol as a main resin of the high-gloss portion at a high ratio and using different resins from each other as the resins of the high-gloss portion and the low-gloss portion, especially excellent design properties are revealed. In addition, in the case of not using a curing agent or in the case of adding a urethane resin as other resin, especially excellent transfer processability is revealed. In addition, as shown in Table 2, it was confirmed that all the decorated molded products of Examples 8-2 to 8-5 obtained using the activator compositions 2 to 5, respectively, with respect to the hydraulic transfer film obtained in Example 8, are extremely good in the results of transfer processing onto a member with a large curvature in a columnar shape and have excellent design properties.

On the other hand, the decorated molded products obtained in Comparative Examples 1 to 5 not using an acrylic polymer polyol as the main resin for the high-gloss portion were inferior in design properties.

INDUSTRIAL APPLICABILITY

The hydraulic transfer film of the present invention is able to provide a decorated molded product having an excellent gloss mat design. The obtained decorated molded product can be suitably utilized as automotive interior materials, building materials, furniture, housings of electrical appliances, and the like.

REFERENCE SINGS LIST

1: Water-soluble film
2: Design layer
2a: Low-gloss portion
2b: High-gloss portion
3: Pattern layer
4: Primer layer
10: Hydraulic transfer film
S: End face

The invention claimed is:

1. A hydraulic transfer film comprising a water-soluble film having thereon a design layer, wherein the design layer has a low-gloss portion and a high-gloss portion; the low-gloss portion and the high-gloss portion are present at least within an end face on the water-soluble film side of the design layer; the low-gloss portion contains a binder resin and a deglossing agent; and the high-gloss portion is composed of a resin composition containing an acrylic polymer polyol and not containing an isocyanate and not containing a curing agent.

2. The hydraulic transfer film according to claim 1, wherein the resin composition that constitutes the high-gloss portion further contains a urethane resin.

3. The hydraulic transfer film according to claim 2, wherein a glass transition point of the urethane resin is from 20 to 100° C.

4. The hydraulic transfer film according to claim 1, wherein the binder resin that constitutes the low-gloss portion comprises one or more members selected from acrylic resins, polyester resins, urethane resins, polycarbonate resins, vinyl chloride-vinyl acetate copolymers, polyvinyl butyral resins, and cellulose nitrate.

5. The hydraulic transfer film according to claim 1, wherein a compounding amount of the deglossing agent that constitutes the low-gloss portion is from 0.5 to 50% by mass.

6. The hydraulic transfer film according to claim 1, wherein a pattern layer is further provided on the design layer.

7. The hydraulic transfer film according to claim 1, wherein the design layer comprises the low-gloss portion formed in a pattern shape and the high-gloss portion formed so as to cover a surface of the low-gloss portion opposite the water-soluble film side of the design layer and so as to cover a region where the low-gloss portion on the water-soluble film is not provided.

8. The hydraulic transfer film according to claim 7, wherein the low-gloss portion and the high-gloss portion are provided directly on and in contact with the water-soluble film.

9. The hydraulic transfer film according to claim 7, wherein a further layer is provided between the water-soluble film and the design layer such that the low-gloss portion and the high-gloss portion are not in contact with the water-soluble film.

10. The hydraulic transfer film according to claim 1, wherein the design layer comprises the high-gloss portion formed in a pattern shape and the low-gloss portion formed so as to cover a surface of the high-gloss portion opposite the water-soluble film side of the design layer and so as to cover a region where the high-gloss portion on the water-soluble film is not provided.

11. The hydraulic transfer film according to claim 1, wherein the design layer comprises the low-gloss portion formed in a pattern shape and the high-gloss portion formed so as to cover a region where the low-gloss portion on the water-soluble film is not provided.

12. The hydraulic transfer film according to claim 1, wherein the low-gloss portion and the high-gloss portion are provided directly on and in contact with the water-soluble film.

13. The hydraulic transfer film according to claim 1, wherein a further layer is provided between the water-soluble film and the design layer such that the low-gloss portion and the high-gloss portion are not in contact with the water-soluble film.

14. The hydraulic transfer film according to claim 1, wherein a ratio of the resin composition of which the high-gloss portion is composed is 5% by mass or less relative to the binder resin contained in the low-gloss portion.

15. The hydraulic transfer film according to claim 1, wherein a ratio of the resin composition of which the high-gloss portion is composed is 3% by mass or less relative to the binder resin contained in the low-gloss portion.

16. The hydraulic transfer film according to claim 1, wherein a ratio of the resin composition of which the high-gloss portion is composed is 1% by mass or less relative to the binder resin contained in the low-gloss portion.

17. A method for manufacturing a decorated molded product using the hydraulic transfer film according to claim 1 and including the following steps (a) to (d):

Step (a): a step of floating the hydraulic transfer film on a water surface such that the water-soluble film side faces on the water surface;

Step (b): a step of coating an activator composition on the design layer side of the hydraulic transfer film;

Step (c): a step of pressing a transfer object onto the hydraulic transfer film having gone through the steps (a) and (b) and bringing the design layer into intimate contact with the surface to be transferred of the transfer object by a hydraulic pressure; and Step (d): a film stripping step of removing the water-soluble film from the surface to be transferred of the transfer object.

* * * * *